Sept. 26, 1939.   E. M. WISE ET AL   2,174,025
CREEP RESISTANT STRUCTURAL ELEMENT SUBJECT TO HIGH TEMPERATURE IN USE
Filed Jan. 6, 1938   2 Sheets-Sheet 1
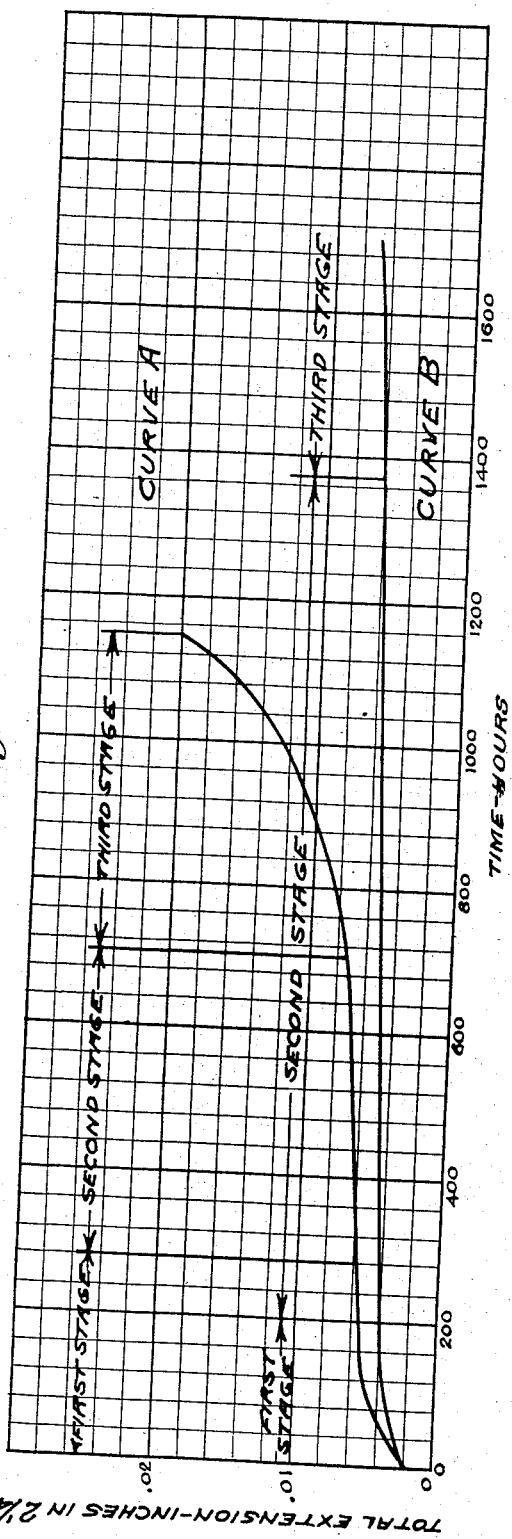
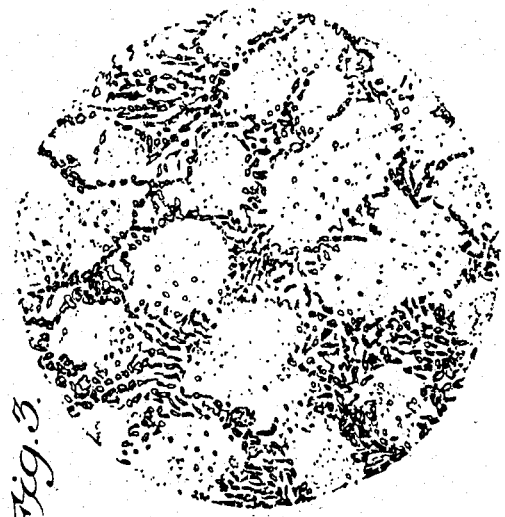
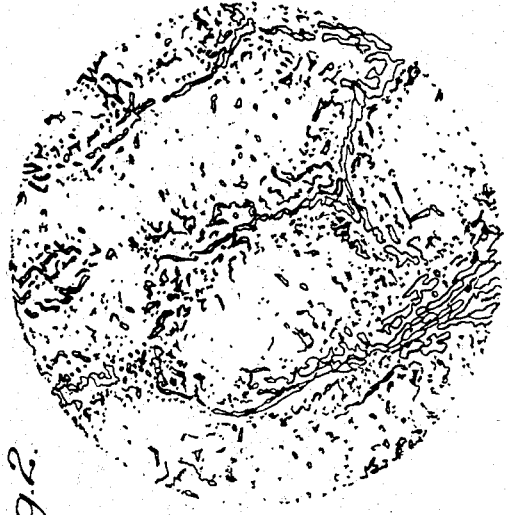
INVENTORS
EDMUND M. WISE
BY JAMES T. GOYY
ATTORNEY.

Sept. 26, 1939.  E. M. WISE ET AL  2,174,025
CREEP RESISTANT STRUCTURAL ELEMENT SUBJECT TO HIGH TEMPERATURE IN USE
Filed Jan. 6, 1938  2 Sheets-Sheet 2

INVENTORS
EDMUND M. WISE
BY JAMES T. GOW
ATTORNEY.

Patented Sept. 26, 1939

2,174,025

UNITED STATES PATENT OFFICE 2,174,025

CREEP RESISTANT STRUCTURAL ELEMENT SUBJECT TO HIGH TEMPERATURE IN USE

Edmund M. Wise, Westfield, N. J., and James T. Gow, Columbus, Ohio, assignors to The International Nickel Company, Inc., New York, N. Y. a corporation of Delaware Application January 3, 1938, Serial No. 183,586

6 Claims. (Cl. 148—31)

The present invention relates to a creep resistant structural element subject in use to loads at elevated temperatures, and, more particularly, to a load supporting element made of an austenitic chromium-nickel-iron-columbium heat resistant alloy and being creep resistant even at high temperatures, as in furnaces and the like.

It is now well known that metals and alloys under prolonged stress at elevated temperatures flow or deform permanently and that such flow or deformation occurs under stresses far below those which can be sustained for short periods of time. This flow or deformation is called creep and the resistance to creep is defined as creep strength. Creep strength is usually expressed in terms of the stress required to produce a given rate of creep such as 1% or 0.1% in 1000 hours.

In determining the creep strengths of alloys, it is usual to apply a fixed load to a specimen which is held at a constant temperature in a furnace, to measure and record the increase in length of the specimen at appropriate intervals and to plot the elongation against time to yield time-elongation curves. If the observations are carried out for a sufficiently long time, these curves can be divided into three sections, determined by the slope of the elongation-time curve, corresponding to the three stages of creep. The first stage, in which the rate of elongation is decreasing, is that made up of the elastic plus plastic flow. The second stage, in which the rate of elongation and the rate of creep remain sensibly constant, is generally the basis for design calculations and exterpolation to indicate the service life. The total time of the first and second stages is also important in indicating service life and is defined as the time to inflection. In the third stage the rate of elongation is increasing and will continue to increase until fracture occurs causing failure of the element.

In recent years the art has been earnestly endeavoring to obtain creep resistant structural elements made of heat resisting alloys, i. e., elements made of alloys with lower rates of creep at elevated temperatures and useful working stresses. The need for creep resistant load supporting elements is especially great in apparatus used by industries where processing involves high temperatures such as the heating and heat treatment of metals; the manufacture of Portland cement, glass, chemicals and pigments; refining of oil and the like.

Early investigators found that the short time high temperature creep strength of steels was increased by the addition of certain alloying elements. For example, molybdenum and tungsten were found to increase the short time high temperature strength of low alloy steels but unfortunately these additions do not materially improve the long time creep strength.

Austenitic chromium-nickel steels have come into wide favor particularly in the chemical industries because of their resistance to corrosion even at temperatures above room temperature. It was found, however, that these steels were subject to a peculiar type of disintegration if they were exposed to corrosive conditions after having been heated within the approximate temperature range of 800° to 1600° F. for example, by welding, or in use at rather moderately elevated temperatures but not at higher temperatures such as 1800° F. The grains of metal would still be bright and apparently uncorroded while the intergranular material would be eaten away. Considerable research in to the causes and means of preventing this phenomenon, known as intergranular corrosion, was provoked. The results of this research have led most investigators to the theory that the cause lies in the formation and precipitation of chromium carbides at the grain boundaries with resultant chromium impoverishment of the matrix in the immediate vicinity thereof, so that when the metal is exposed to strong corrodants the material near the grain boundaries is eaten away. The ideal condition, so far as prevention of intergranular corrosion is concerned, would therefore be a carbon content not in excess of the amount the alloy could retain in solid solution. The experiments of Bain and his co-workers have been interpreted by them to establish that in 18% chromium, 8% nickel type steels the maximum amount of carbon that can be safely used does not exceed about 0.02%, as reported in Transactions of the American Society for Steel Treating, vol. XXI (1933), pages 481 to 509. Under present commercial practice on an industrial scale it is impracticable, however, to manufacture steels of this type with such a low carbon content. The art was accordingly compelled to look to some other expedient for a commercially practicable solution of this problem which was of particular importance in wrought rather than cast alloys. Among the proposed solutions was the addition of carbide forming elements such as tungsten, molybdenum, titanium, columbium, tantalum, etc., to austenitic chromium-nickel steels having as low a carbon content as it was practicable to produce. These carbide forming elements, if added in amounts at least equal to the stoichiometric proportions for combining with all the carbon, are supposed to prevent the formation and therefore the precipitation of chromium carbides at the grain boundaries. The importance of properly proportioning columbium, as an example of these elements, to the carbon, and of keeping the latter relatively low, i. e., about 0.15% or less, in order to prevent intergranular corrosion in austenitic chromium-nickel steels is discussed in an article on "Effect of Columbium in Chromium-Nickel Steels" by Becket & Franks published in the Transactions of the American Institute of Mining and Metallurgical Engineers, vol. 113 (1934), pages 143 to 162. Data are given on page 150 which show that a ratio of columbium to carbon of about 10:1 is necessary to provide immunity to disintegration in steels containing up to about .15% carbon. This is slightly in excess of the stoichiometric ratio for forming CbC (93.3:12 or 7.8:1). Similar data for titanium are given on pages 502 to 508 of Bain's article referred to above, showing that a ratio of about 6:1 is necessary whereas the stoichiometric ratio for forming TiC is about 4:1 (47.9:12). The reason why a slight excess over the stoichiometric ratio is necessary is explained on page 507 of the said article by Bain.

The research into the causes and means of preventing intergranular corrosion did not assist in any way toward a solution of the problem of increasing the creep strength of structural elements made of heat resistant alloys which are exposed to high temperatures during use, such as is the case with furnace structural elements, rolls for glass making, tubes used in the distillation and cracking of oil and various other high temperature uses, especially those of the chemical and metallurgical industries. Many attempts have been made to solve the outstanding problem of providing the art with a creep resistant structural element, especially a load-supporting element, subject to high temperature in use and to satisfy the need of such elements, but, as far as we are aware, none has been wholly successful, especially when carried into practice on an industrial scale.

We have discovered that a creep resistant load supporting element made of austenitic chromium-nickel-iron-columbium alloys solves the problem confronting the art.

It is an object of the present invention to provide a load supporting element made of chromium-nickel-iron-columbium alloy having a special carbon content which possesses not only superior creep strength but also possesses heat resistance even at elevated temperatures up to about 1800° F.

It is a further object of the invention to provide a load supporting member made of an austenitic chromium-nickel-iron-columbium alloy having improved physical properties at elevated temperatures as a result of which the structural member may have a smaller cross section and still possess the same strength as conventional structural members having a larger cross section and constituted of prior alloys whereby a saving in the amount of metal used, of heat consumed, etc. may be effected.

It is also within the contemplation of the invention to provide a load supporting element made of a columbium-containing austenitic chromium-nickel-iron alloy having a special carbon content and having a relatively high creep strength and a fine grain structure with finely distributed carbides.

Other objects and advantages of the invention will become apparent from the following description taken in conjunction with the accompanying drawings in which:

Fig. 1 illustrates a graph of time-elongation curves of a prior art alloy free from columbium (curve A) and an austenitic chromium-nickel-iron alloy containing columbium and carbon within critical limits which are used in conjunction with the present invention (curve B);

Fig. 2 represents a photomicrograph of the structure of a prior columbium free chromium-nickel-iron alloy in the cast and annealed condition;

Figure 4:
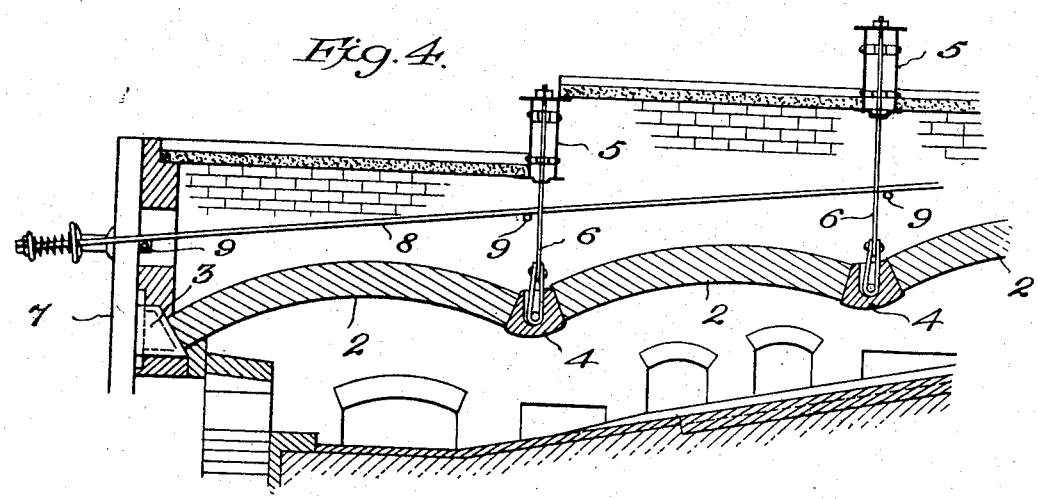
Figure 5:
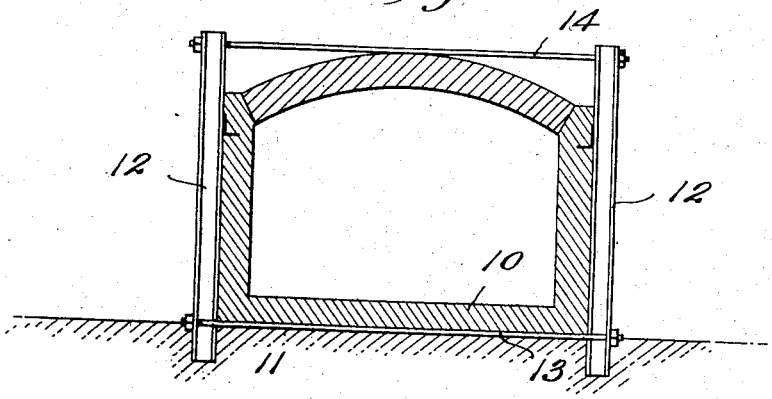
Figure 6:
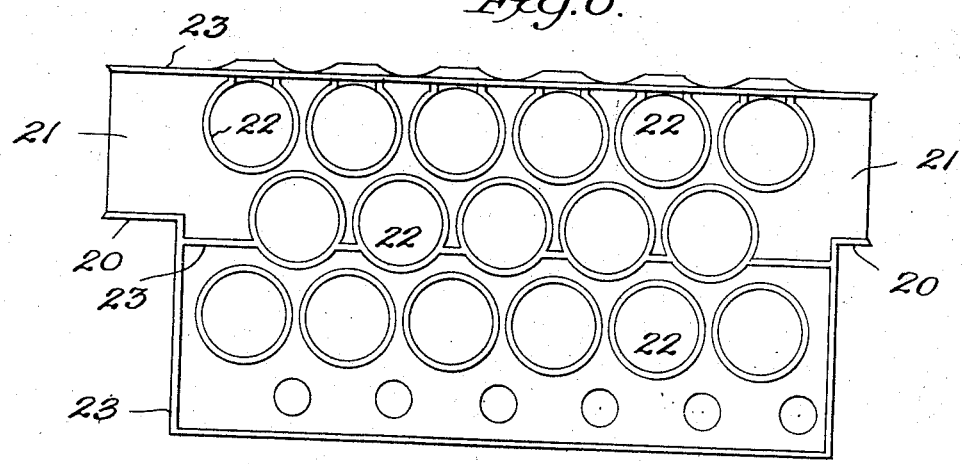

Fig. 3 also represents a photomicrograph of the structure of a chromium-nickel-iron alloy embodying special amounts of columbium and carbon in accordance with the principles of the present invention and being in the cast and annealed condition;

Fig. 4 is a somewhat diagrammatic sectional view of a portion of a typical roof construction for a wide continuous heating furnace showing load supporting elements embodying the present invention;

Fig. 5 depicts a generalized sectional view of a furnace bound with buckstays and tie rods constructed in accordance with the principles of the present invention; and Fig. 6 shows a side view of a tube support for oil still tubes cast from a nickel-chromium-columbium-iron alloy of the present invention.

Generally speaking, the load supporting elements according to the present invention are made of an improved heat resisting austenitic chromium-nickel-iron alloy containing special amounts of columbium and of carbon, varying from about 0.5 to about 5% and about 0.25% to about 0.75%, respectively.

An austenitic chromium-nickel-iron alloy will be understood by those skilled in the art to mean an alloy which is essentially a solid solution possessing a face-centered cubic structure both at high temperatures and after cooling to low temperatures at ordinary rates. Nickel is primarily responsible for the production of this desirable austenitic structure, while the nickel and chromium jointly contribute to the resistance to oxidation. More specifically austenitic alloys, containing about 10 to 30% chromium, about 8 to 50% nickel and the balance essentially iron, are employed for making load supporting elements according to the present invention. For certain purposes the nickel content may exceed 50%, for example, very satisfactory glass forming rolls may be made containing about 65% nickel. Other elements in minor amounts such as manganese, silicon, etc., which may normally be present in commercial alloys, may be present without appreciably modifying the characteristics of the alloy or departing from the scope of the present invention and it is to be understood that such elements are included in the term "the balance essentially all iron."

We have discovered that a carbon content within the special range of about 0.25 to 0.75% has provided highly satisfactory results when used in conjunction with a special content of columbium in austenitic chromium-nickel-iron alloys and new results have been achieved with respect to creep strength. However, it was found that even in low carbon alloys tested at 1800° F. and with a stress of 1000 pounds per square inch the second stage of creep decreased from .00077% per hour for the columbium free alloy to .00001% per hour for an alloy containing about 2.5% columbium and about .06% carbon. The creep rate of the columbium alloy at a stress of 2000 pounds per square inch was even lower than that of the columbium free alloy at a stress of 1000 pounds per square inch as is shown in Schedule I.

SCHEDULE I

*Effect of columbium on the creep rate of low carbon alloys in the cast and annealed condition*

| Alloy No. | Cr | Ni | C | Cb | Fe | Second stage creep rate percent per hour at 1800° F. | |
|---|---|---|---|---|---|---|---|
| | | | | | | Stress 1000 psi | Stress 2000 psi |
| 1 | 25.94 | 20.77 | .06 | 0 | Bal. | .00077 | |
| 2 | 26 | 20 | .06 | 2.5 | Bal. | .00001 | .00024 |

It is well known that the addition of carbon within limits to a chromium-nickel-iron heat resisting alloy improves its creep strength and we have discovered that the further addition of columbium to these carbon containing alloys gives new results and still further improves the creep strength. This is illustrated in Fig. 1 in which curve A gives the time-elongation curve obtained on an old columbium-free alloy tested in the cast and annealed condition at a stress of 3000 pounds per square inch and at 1800° F. and curve B gives the time-elongation curve obtained on a new columbium-containing alloy under the same test conditions. The chemical analyses were, respectively, about 25.46% chromium, 20.52% nickel, 1.41% silicon, 0.37% carbon, balance essentially iron, and 24.63% chromium, 19.55% nickel, 1.42% silicon, carbon 0.33%, 2.49% columbium and balance essentially iron. It will be noted that the second stage creep rate of the new columbium-containing alloy (.00007%/hr.) is about one hundred percent better than that of the old columbium-free alloy (.00015%/hr.) with respect to creep strength. It will also be noted that the columbium-containing alloy required about 1366 hours to reach a point of inflection (beginning of rapid increasing creep rate) which is about twice the time (about 690 hours) required by the columbium-free alloy. Thus, it will be seen that the columbium-containing alloy will have at least twice the useful life in high temperature service that a columbium-free alloy would have.

We have discovered that even small additions of columbium of the order of ½% improve the creep strength, but for marked improvement in creep strength, 1% or more of the columbium is required. The upper limit is about 5% but for most applications about 3% is a preferred maximum columbium content. Typical results are given in Schedule II.

SCHEDULE II

*Effect of columbium on creep rates of carbon-containing alloys tested in the cast and annealed condition*

| Alloy No. | Cr | Ni | C | Cb | Fe | Second stage creep rate percent per hour at 1800° F. | |
|---|---|---|---|---|---|---|---|
| | | | | | | Stress 2000 psi | Stress 3000 psi |
| 3 | 25.46 | 20.52 | 0.37 | 0 | Bal. | .000069 | .00015 |
| 4 | 26 | 20 | 0.39 | 0.54 | Bal. | .000035 | |
| 5 | 26 | 20 | 0.41 | 1.21 | Bal. | .000008 | .000062 |
| 6 | 26 | 20 | 0.33 | 2.54 | Bal. | .000004 | .000067 |

We found that the addition of columbium to the carbon-containing chromium-nickel-iron heat resisting alloys favorably changed the structure of these alloys yielding a better product. The micro-structure of the columbium-free alloys containing carbon, as clearly seen in Fig. 2, reveals an austenitic matrix with massive carbides segregated immediately adjacent to the grain boundry carbides. In service at high temperature these fine carbides agglomerate into coarse carbides which merge with the original massive carbides. These movements are likely to produce localized volume changes distorting the surface of the alloy. Fig. 2 is a photomicrograph of alloy No. 3 of Schedule II in the cast and annealed condition, taken at a magnification of 500 diameters. In contrast, the microstructure of the columbium-containing alloy, as seen in Fig. 3, reveals only the fine carbides and these are relatively stable as they do not agglomerate to the same extent as the fine carbides of the columbium-free alloy. Fig. 3 is a photomicrograph of alloy No. 6 of Schedule II, also in the cast and annealed condition and taken at a magnification of 500 diameters. This superiority of the columbium-containing alloy is especially important in certain applications for heat resisting alloys, such as glass forming rolls, where the roll must be capable of taking and of maintaining a good polished surface which will not mark the glass.

Although most of the data presented here relates to columbium containing chromium-nickel-iron alloys of the 26% chromium, 20% nickel type which are particularly useful in heat and corrosion resistant applications where substantial amounts of sulphur are present, many applications require alloys with different chromium and nickel contents. We have discovered that the addition of columbium to other austenitic chromium-nickel-iron base compositions similarly improves the creep strength. Thus, at about 1800° F. the results shown in Schedule III were obtained on high nickel content alloys.

SCHEDULE III

*Effect on columbium on creep rates of high nickel alloys in the cast and annealed condition*

| Alloy No. | Cr | Ni | C | Cb | Fe | Second stage creep rate percent per hour at 1800° F. | |
|---|---|---|---|---|---|---|---|
| | | | | | | Stress 2000 psi | Stress 3000 psi |
| 7 | 22.83 | 42.32 | .35 | 0 | Bal. | .00026 | .0019 |
| 8 | 22.50 | 42 | .35 | 2.5 | Bal. | .000005 | .00079 |

It will again be observed that columbium markedly improves the creep strength of the austenitic chromium-nickel-iron heat resisting alloys.

We have further discovered that similar improvements in creep strengths may be obtained by the addition of columbium to austenitic chromium-nickel-iron heat resisting alloys generally.

By controlling the chromium and nickel content of the columbium-containing alloy of the present invention, the improved alloy may be made to possess a wide range of useful properties as will be well understood by those skilled in the art.

In producing the new alloy, we prefer to follow the conventional furnacing methods for producing chromium-nickel-iron alloys with the additional provision that the requisite quantity of columbium is added preferably late in the melting period to minimize losses of this rather expensive element. The columbium may be added as pure columbium, but is preferably added as the less expensive commercially available ferro-columbium, which may also contain some tantalum.

The alloys used for making the load supporting elements of the present invention should not be confused with the above mentioned chromium-nickel-iron alloys to which modifying elements such as columbium, tantalum, titanium, tungsten, molybdenum, etc., are added to low carbon alloys to reduce the susceptibility to intergranular attack by chemicals and brittleness resulting from heating during welding. While columbium is effective in raising the creep strength of both high and low carbon alloys, the best results are obtained on the high carbon alloys which is the direct opposite to what was found in the inventions referred to above.

In Figs. 4 and 5 are illustrated specific embodiments of load supporting elements in conventional metallurgical furnaces which are constructed in accordance with the invention from nickel-chromium-iron-columbium alloys. The furnace of Fig. 4 has a wide continuous hearth 1 with a plurality of arches 2 over it. The arches 2 are supported at their ends by abutments 3 and 4. In order to give vertical support to the abutments 4, girders 5 are transversely mounted on the side walls of the furnace directly above them from which abutment supporting rods 6 depend and connect with suitable means in the abutment 4, as shown. The furnace is bound by buckstays 7, longitudinal tie rods 8 and transverse tie rods 9. Those skilled in the art will understand that the abutment supporting rods 6, the longitudinal tie rods 8 and transverse tie rods 9 are subjected in use to elevated temperatures and heavy loads due to the expansion of the refractories in the arches with increasing temperature. By making them of nickel-chromium-iron-columbium alloys in accordance with the principles of the present invention the useful life of these load supporting elements is greatly extended.

Fig. 5 illustrates a similar application of tie rods made in accordance with the present disclosure in a single arch furnace with a solid hearth 10 resting on a solid foundation 11. Buckstays 12, bottom tie rods 13 and top tie rods 14 constitute the furnace binding. Because the solid hearth and solid foundation leave no cool place for the bottom tie rod 13, it must withstand prolonged exposure to high temperature and stress set up by the expansion of the hearth without appreciable elongation. Tie rods made of nickel-chromium-iron alloys of the 26% chromium, 20% nickel type with about .40% carbon and 1 to 3% columbium are eminently satisfactory for such purposes.

A tube support for oil still tubes such as that shown in Fig. 6 is an example of a structure which is advantageously formed by casting the alloys of the 26% chromium, 20% nickel type having about .40 to .75% carbon and from about 1 to about 3% of columbium. The tube support shown is of conventional design so far as shape is concerned, having shoulders 20 adapted to rest on supporting structures in the furnace, a web 21 having flanged openings 22 to receive the oil still tubes and reinforcing flanges 23 to strengthen and rigidify the support. When cast of the columbium containing alloys of the present invention, however, it may be made of lighter sections yet still have creep strength superior to prior art tube supports.

Similar results have been obtained with alloys having even higher nickel contents. For example, glass forming rolls containing about 65% nickel, about 15% chromium, about 0.75% carbon, about 1 to 5% columbium and the balance essentially iron were found to have not only high creep strength but to take and maintain a good polished surface in operation, probably traceable to the stability of the structure even at the elevated temperatures encountered in service.

It is to be observed that the present invention provides a load supporting element made of an improved columbium containing chromium-nickel-iron heat resisting alloy containing special amounts of columbium and carbon with a superior creep strength.

It is further to be noted that this invention provides a load supporting element made of an improved columbium containing chromium-nickel-iron heat resisting alloy containing special amounts of columbium and carbon which is especially suited for heat resistant purposes.

Furthermore, it is to be observed that the present invention provides an improved columbium-containing chromium-nickel-iron heat resisting alloy which is especially suited for use as load bearing structural members in high temperature service.

Moreover, it is to be noted that the load supporting structural elements of the present invention have a superior creep strength which permits the use of thinner sections whereby equipment having lighter weight but the same strength as conventional equipment may be employed thereby saving metal and heat.

It is also of importance that the casting properties are not impaired by columbium whereas aluminum, titanium, and the like, cause difficulties in the practical production of castings in the foundry due to their tendency to form oxide skins on the metal.

It is likewise to be noted that the present invention provides structural elements made of an improved columbium-containing chromium-nickel-iron heat resisting alloy having a superior fine grain structure with finely distributed carbides, probably containing both chromium and columbium which, besides increasing the strength, aids in obtaining and maintaining the smooth surface essential in certain applications such as glass forming rolls.

Although the present invention has been described in conjunction with preferred embodiments, it is understood that modifications and variations may be resorted to without departing from the spirit and scope of the invention. Thus, when the term "load supporting element" or "structural element" is used, it includes such members as oil still tubes and tube supports, furnace parts, such as hearths, conveying rollers, work supports, heating element supports, enameling racks, carburizing boxes, frame work, etc., glass forming rolls and other elements subject to stress at high temperatures. Similarly, when "psi" is used, it means "pounds per square inch". Likewise the term "balance essentially all iron" means that the alloy has substantially those creep characteristics which would obtain if the balance were all iron, but it does not exclude impurities that are normally present in commercial alloys as will be understood by those skilled in the art.

Further, when the term "improved creep rate in the second stage less than 0.00024% per hour" is used in the claims it refers to the creep rate for a base or standard composition of 26% chromium, 20% nickel, 0.06% carbon, and 2.5% columbium. As will be apparent from the specification, and particularly Schedules I, II and III, the creep rate will vary with the composition and the stress, but will always be smaller for the columbium-containing composition than for a similar columbium-free composition. It will also be apparent to those skilled in the art that the creep rate is dependent upon the temperature to which the articles are subjected. Likewise, when the term "improved creep strength at leas 100% better than one made of a similar alloy free from columbium" is used, it refers to the second stage creep strength for a base or standard composition of 26% chromium, 20% nickel, 0.4% carbon, and 2.5% columbium under a stress of 3000 psi at a temperature of 1800° F. and will vary with the composition, stress and temperature.

We claim:

1. As an article of manufacture, a creep-resistant, load supporting element subject to high temperature in use and made of a creep and heat resistant austenitic chromium-nickel-iron alloy characterized by a structure having an austenitic matrix and relatively stable fine carbides distributed in the grains, said alloy comprising 10 to 30% chromium, 8 to 50% nickel, 0.25 to 0.75% carbon, 0.5% to 3% columbium, and the balance essentially all iron, said load supporting element having an improved creep rate in the second stage less than 0.00024% per hour under a stress of 2000 pounds per square inch at 1800° F.

2. As an article of manufacture, a creep-resistant, load-supporting element subject to high temperatures in use and made of a creep and heat resistant iron-nickel-chromium alloy having an austenitic matrix and comprising 10% to 30% chromium, 8% to 65% nickel, 0.06% to 0.75% carbon, 0.5% to 5% columbium, and the balance essentially all iron, said load supporting element having an improved creep strength at least 100% better than one made of a similar alloy free from columbium.

3. As an article of manufacture, a creep-resistant, cast structural element subjected in use to stress at elevated temperatures and constituted of a creep and heat resistant austenitic chromium-nickel-iron alloy characterized by a structure having an austenitic matrix and relatively stable fine carbides distributed in the grains, said alloy comprising 26% chromium, 20% nickel, 0.25 to 0.75% carbon, 1% to 3% columbium, and the balance essentialy all iron, said cast structural element having an improved creep rate in the second stage less than 0.00024% per hour under a stress of 2000 pounds per square inch at 1800° F.

4. As an article of manufacture, a creep resistant, cast, structural element subjected in use to stress at elevated temperatures and constituted of a creep and heat resistant austenitic chromium-nickel-iron alloy characterized by a structure having an austenitic matrix and relatively stable fine carbides distributed in the grains, said alloy comprising 10 to 30% chromium, 8 to 65% nickel, 0.25 to 0.75% carbon, 0.5 to 5% columbium, and the balance essentially all iron, said cast structural element having an improved creep strength at least 100% better than one made of a similar alloy free from columbium.

5. As an article of manufacture, a creep-resistant, cast, oil still tube support made of a creep and heat resistant austenitic chromium-nickel-iron alloy characterized by a structure having an austenitic matrix and relatively stable fine carbides distributed in the grains, said alloy comprising 26% chromium, 20% nickel, 0.4% carbon, 0.5% to 3% columbium, and the balance essentially all iron, said cast oil still tube support having an improved creep rate in the second stage less than 0.00024% per hour under a stress of 2000 pounds per square inch at 1800° F.

6. As an article of manufacture, a creep-resistant oil still tube support made of a creep and heat resistant austenitic chromium-nickel-iron alloy characterized by a structure having an austenitic matrix and relatively stable fine carbides distributed in the grains, said alloy comprising 10 to 30% chromium, 8 to 50% nickel, 0.25 to 0.75% carbon, 0.5 to 3% columbium, and the balance essentially all iron, said oil still tube support having an improved creep rate at least 100% better than one made of a similar alloy free from columbium.

EDMUND M. WISE.
JAMES T. GOW.